US012680330B2

(12) United States Patent
 Baran

(10) Patent No.: US 12,680,330 B2
(45) Date of Patent: Jul. 14, 2026

(54) MULTIMEDIA TOMBSTONE DEVICE

(71) Applicant: Brandon Baran, Toledo, OH (US)

(72) Inventor: Brandon Baran, Toledo, OH (US)

( * ) Notice: Subject to any disclaimer, the term of this patent is extended or adjusted under 35 U.S.C. 154(b) by 178 days.

(21) Appl. No.: 18/408,758

(22) Filed: Jan. 10, 2024

(65) Prior Publication Data

US 2025/0223827 A1      Jul. 10, 2025

(51) Int. Cl.
*E04H 13/00* (2006.01)
*G06F 1/26* (2006.01)
*G06F 16/438* (2019.01)

(52) U.S. Cl.
CPC ............. *E04H 13/003* (2013.01); *G06F 1/26* (2013.01); *G06F 16/4393* (2019.01); *E04H 13/00* (2013.01); *E04H 13/001* (2013.01); *E04H 13/006* (2013.01); *E04H 13/008* (2013.01)

(58) Field of Classification Search
CPC ... E04H 13/003; E04H 13/001; E04H 13/006; E04H 13/008; E04H 13/00; G06F 1/26; G06F 16/4393
See application file for complete search history.

(56) References Cited

U.S. PATENT DOCUMENTS

| | | | | | |
|---|---|---|---|---|---|
| 5,404,343 | A | * | 4/1995 | Boggio | .................. H04R 27/00 369/69 |
| 6,340,978 | B1 | * | 1/2002 | Mindrum | .............. G06Q 10/10 715/764 |
| 6,414,663 | B1 | * | 7/2002 | Manross, Jr. | ........ G09G 3/3611 52/103 |
| 7,609,506 | B2 | | 10/2009 | Aguirre | |
| 8,068,035 | B1 | * | 11/2011 | Salcedo | ................ E04H 13/003 340/384.1 |
| D683,105 | S | | 5/2013 | Victor | |
| 9,350,425 | B1 | * | 5/2016 | Lewis | .................... A61G 17/08 |
| 10,233,663 | B1 | | 3/2019 | Grupp | |
| 10,372,162 | B1 | | 8/2019 | Beaulieu | |
| 10,458,144 | B1 | | 10/2019 | Yearick | |
| D879,403 | S | | 3/2020 | Teague | |
| 2001/0036354 | A1 | * | 11/2001 | Majors | ............... H04N 21/4622 386/346 |
| 2005/0204300 | A1 | * | 9/2005 | Mindrum | .............. G06Q 10/10 715/764 |
| 2010/0307037 | A1 | | 12/2010 | Chi | |
| 2012/0155066 | A1 | * | 6/2012 | Carlson | ................... F21S 9/032 362/145 |
| 2021/0131136 | A1 | | 5/2021 | King | |
| 2021/0372157 | A1 | | 12/2021 | Damico | |
| 2025/0078694 | A1 | * | 3/2025 | Ware | ..................... H04N 5/655 |

FOREIGN PATENT DOCUMENTS

EP          2284334          2/2011

* cited by examiner

*Primary Examiner* — Omar F Hijaz

(57)          ABSTRACT

A multimedia tombstone device includes a tombstone which is positionable at a gravesite and the tombstone is substantially hollow. A display is integrated into the tombstone wherein the display is configured to be visible to the observers of the gravesite. A multimedia unit is integrated into the tombstone and the multimedia unit stores an obituary of the decedent and digital imagery pertaining to the decedent and a biography of the decedent. The display can display either the obituary or the digital imagery or the biography to facilitate to observer of the gravesite to view the obituary or the digital imagery or the biography. A light is integrated into the tombstone thereby facilitating the observer of the gravesite to locate the tombstone during darkened hours.

1 Claim, 6 Drawing Sheets

MULTIMEDIA TOMBSTONE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

(1) Field of the Invention.

The disclosure relates to tombstone devices and more particularly pertains to a new tombstone device for enhancing the memorization of a decedent at a gravesite. The device includes a tombstone which is substantially hollow and a display integrated into the tombstone and a multimedia unit integrated into the tombstone. The display can display either an obituary of the decedent or digital imagery of the decedent or a biography of the decedent. The device includes a light integrated into the tombstone which is continually illuminated.

(2) Description of Related Art Including Information Disclosed Under 37 CFR 1.97 and 1.98

The prior art relates to tombstone devices including a variety of multimedia funerary devices that each at least includes a gravesite marker and a multimedia unit integrated into the gravesite marker for displaying imagery related to a decedent and a solar gravestone device that includes a reliquary for displaying relics associated with a decedent. In no instance does the prior art disclose a multimedia tombstone device that includes a substantially hollow tombstone and a multimedia unit integrated into the tombstone which stores an obituary and digital imagery and a biography pertaining to a decedent which can be selectively viewed on the multimedia unit.

BRIEF SUMMARY OF THE INVENTION

An embodiment of the disclosure meets the needs presented above by generally comprising a tombstone which is positionable at a gravesite and the tombstone is substantially hollow. A display is integrated into the tombstone wherein the display is configured to be visible to the observers of the gravesite. A multimedia unit is integrated into the tombstone and the multimedia unit stores an obituary of the decedent and digital imagery pertaining to the decedent and a biography of the decedent. The display can display either the obituary or the digital imagery or the biography to facilitate to observer of the gravesite to view the obituary or the digital imagery or the biography. A light is integrated into the tombstone thereby facilitating the observer of the gravesite to locate the tombstone during darkened hours.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
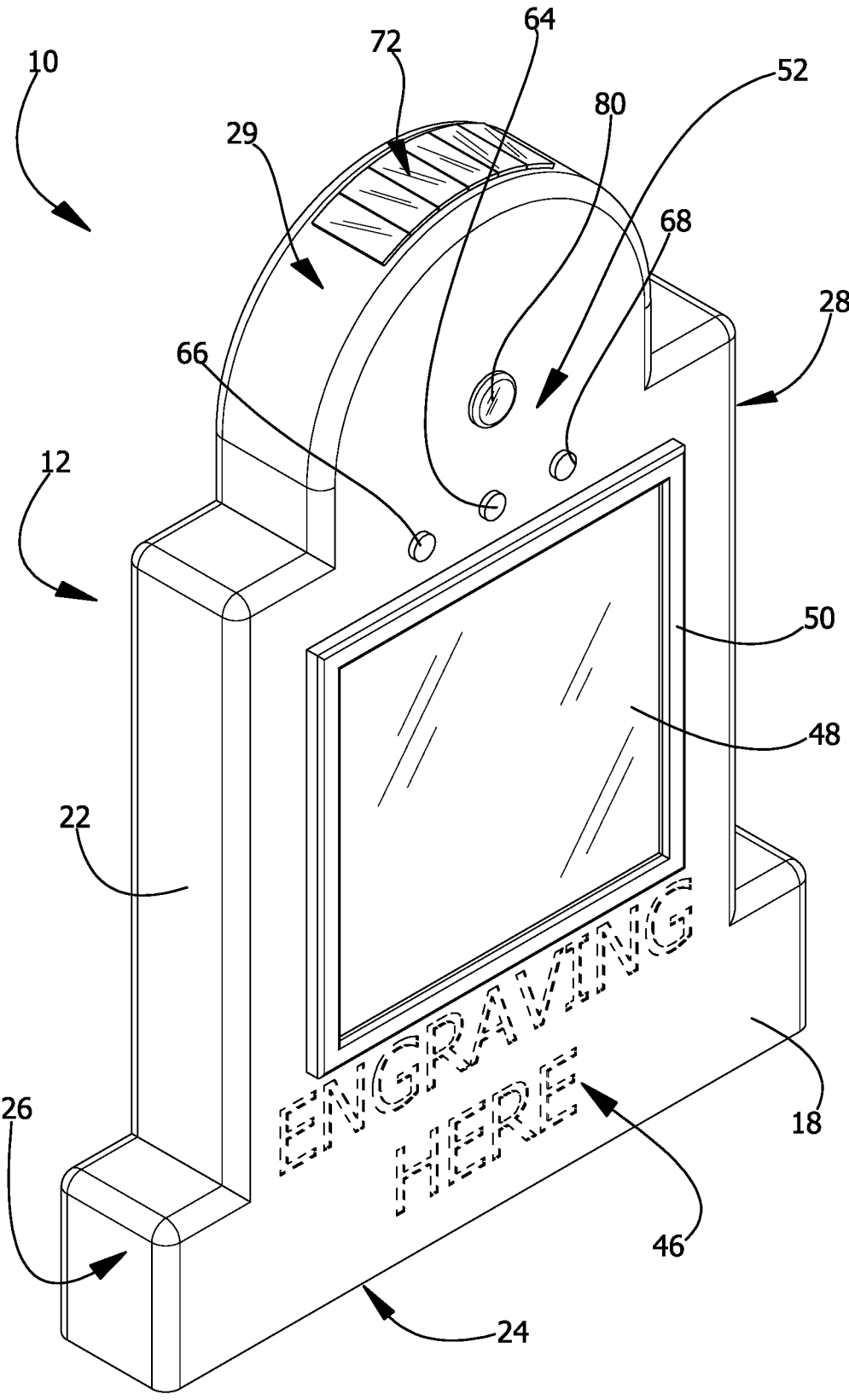
FIG. 1 is a front perspective view of a multimedia tombstone device according to an embodiment of the disclosure.
Figure 2:
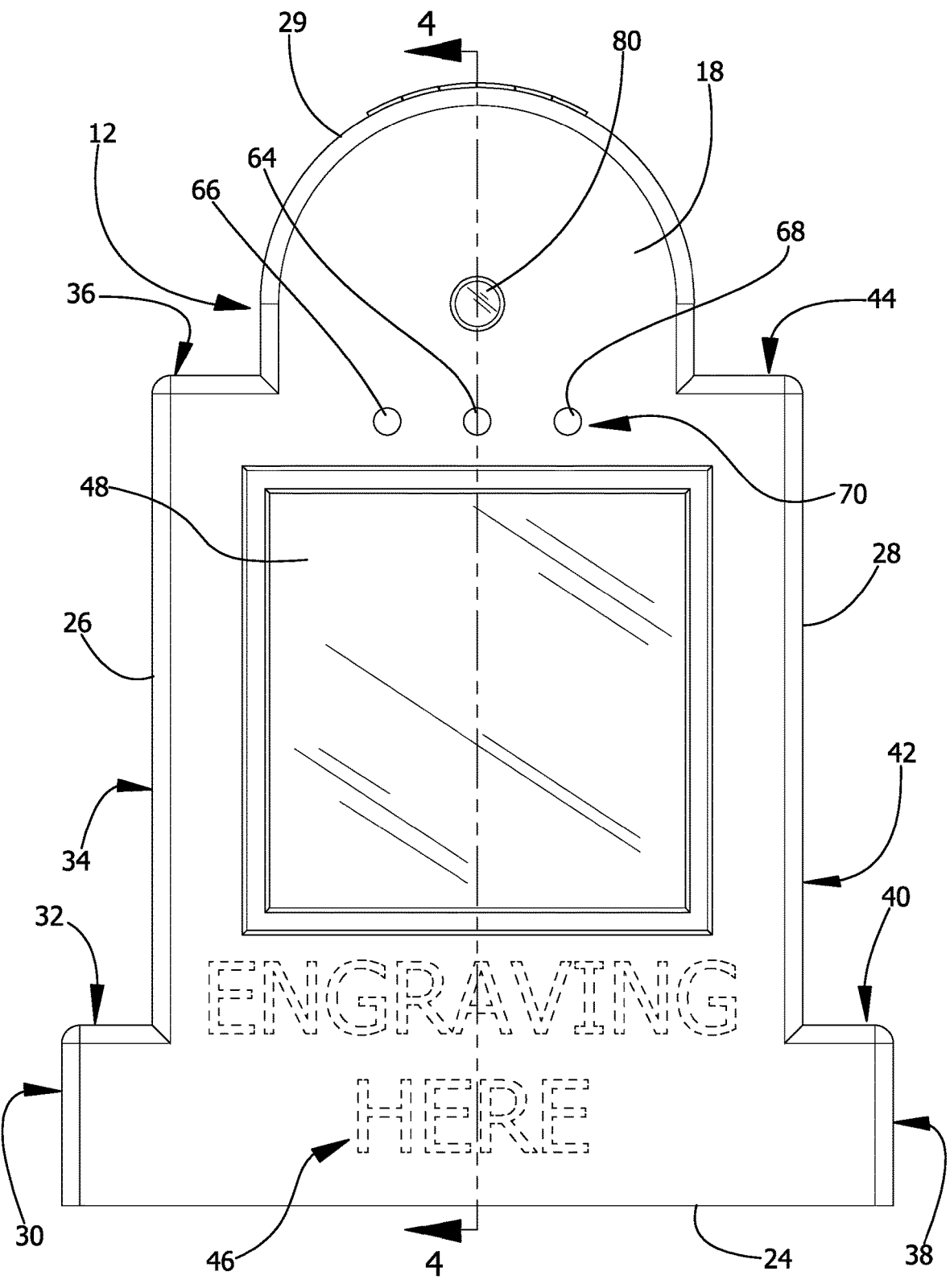
FIG. 2 is a front view of an embodiment of the disclosure.
Figure 3:
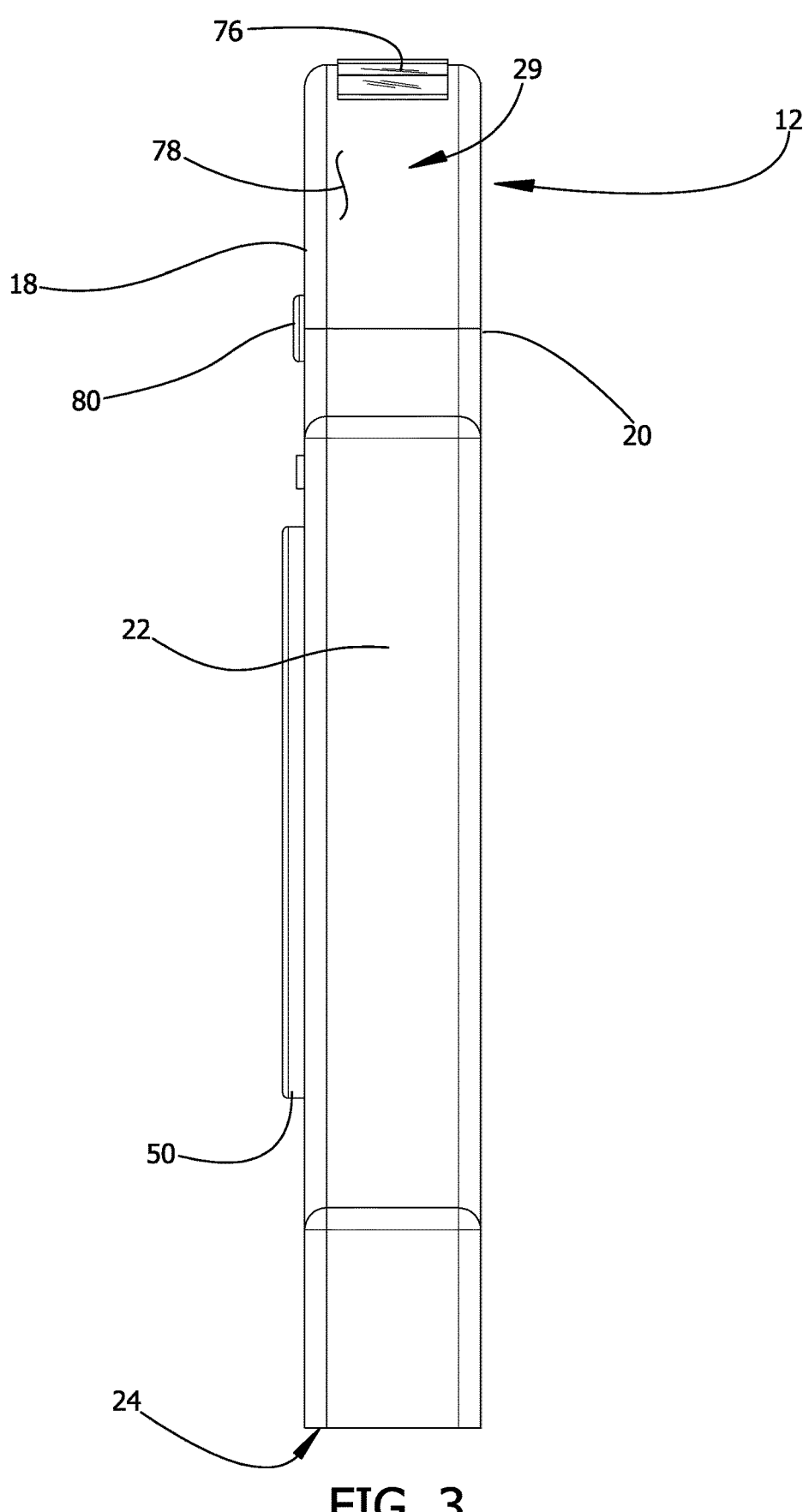
FIG. 3 is a left side view of an embodiment of the disclosure.
Figure 4:
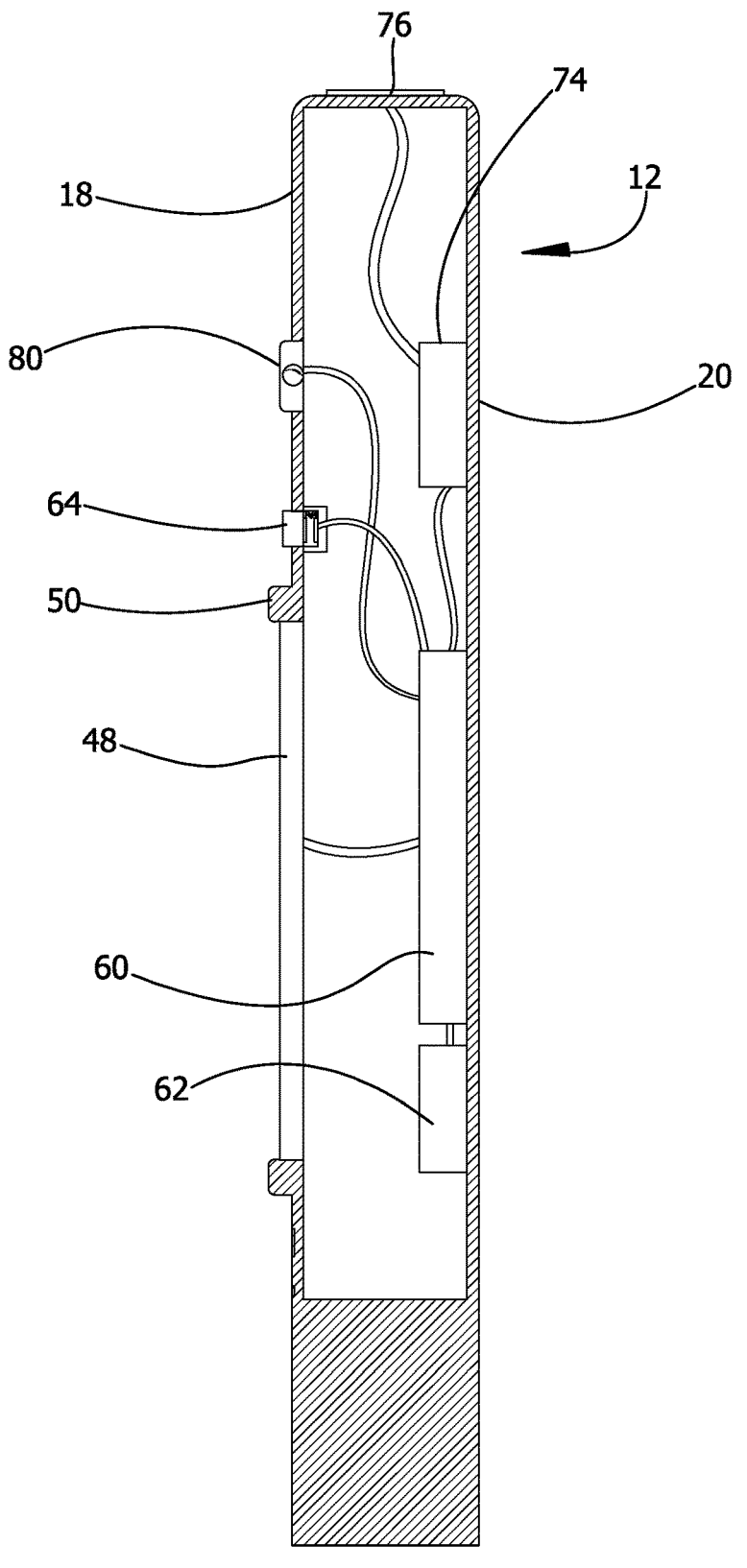
FIG. 4 is a cross sectional view taken along line 4-4 of FIG. 2 of an embodiment of the disclosure.
Figure 5:
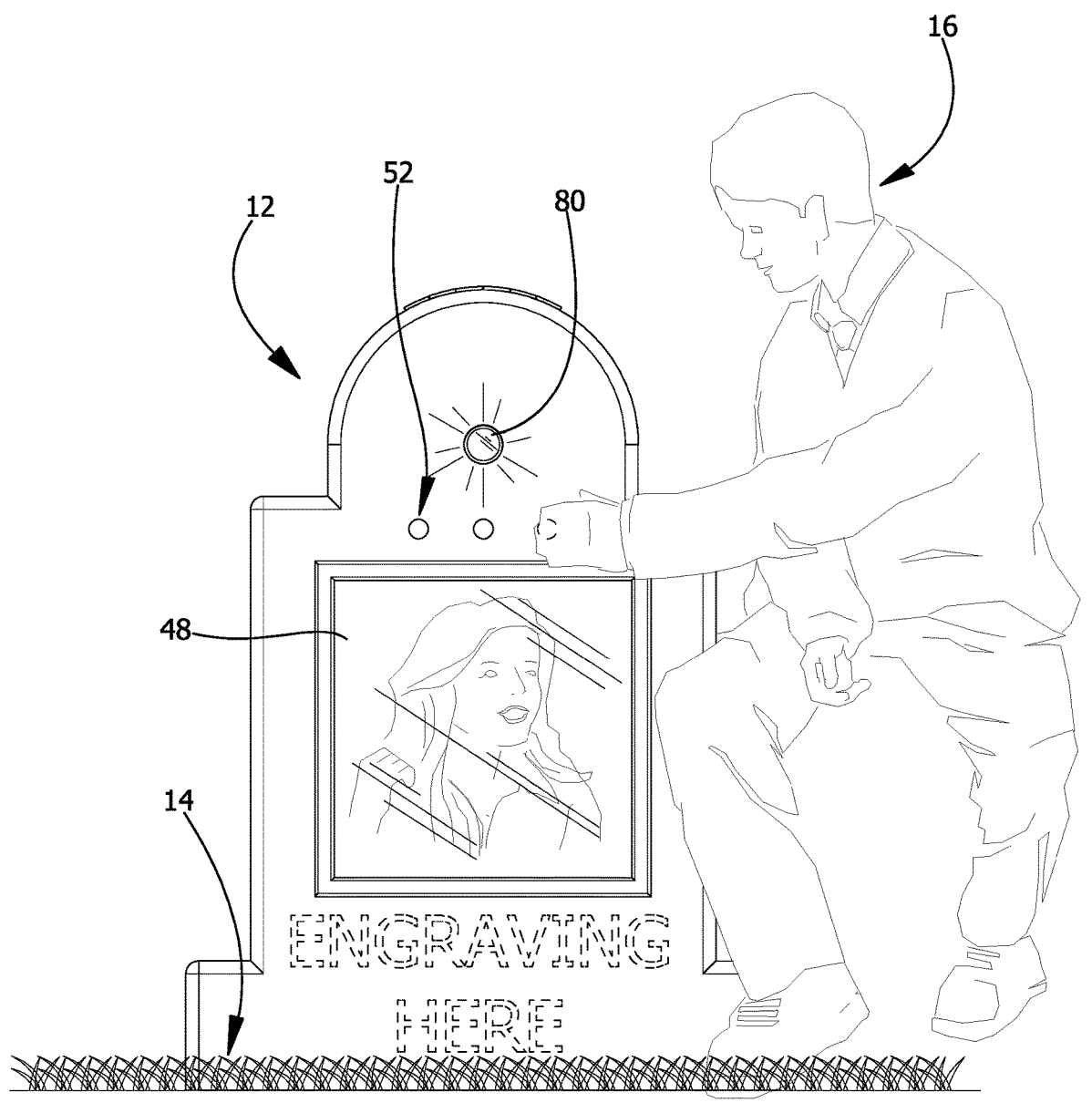
FIG. 5 is a perspective in-use view of an embodiment of the disclosure.
Figure 6:
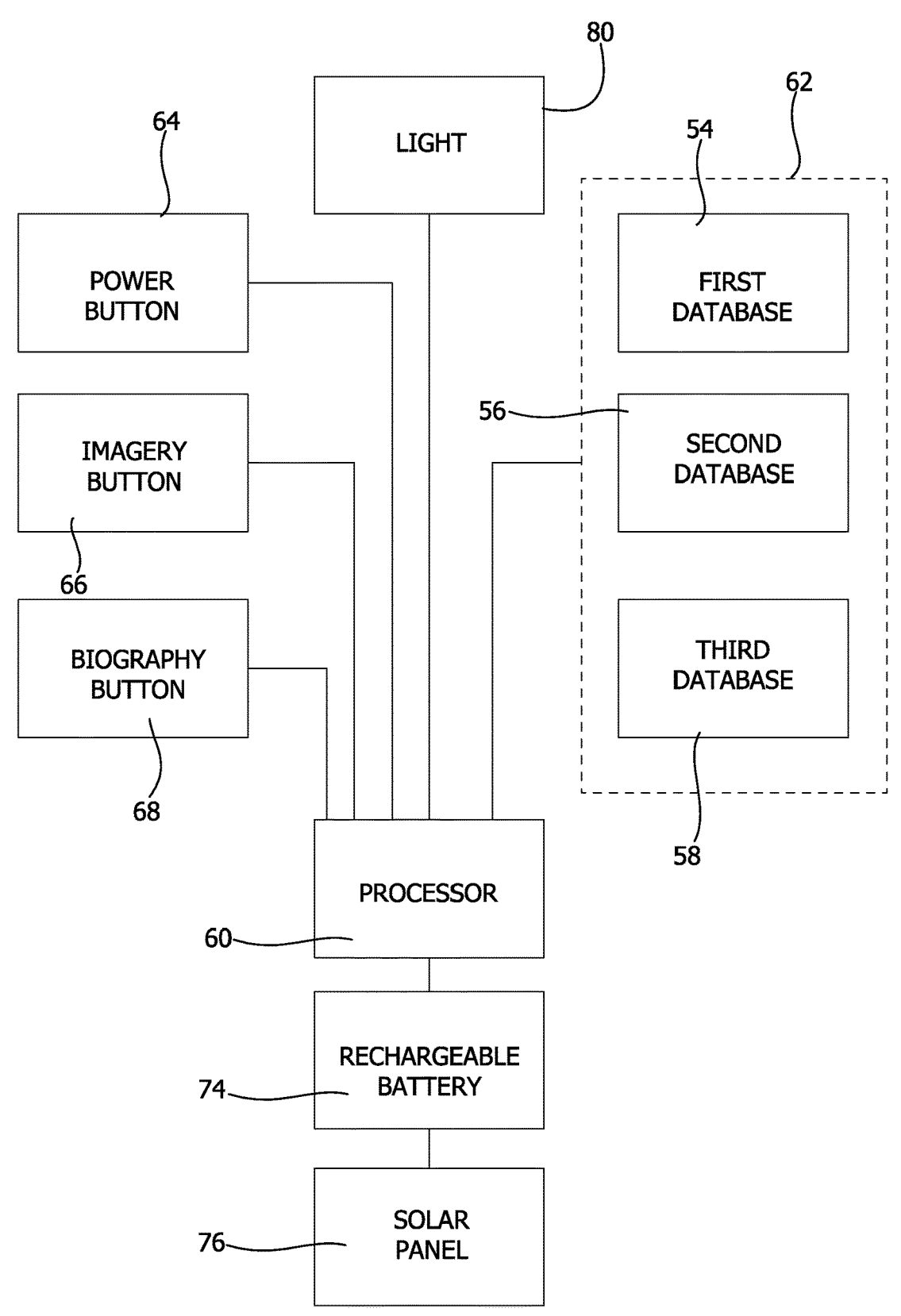
FIG. 6 is a schematic view of an embodiment of the disclosure.

With reference now to the drawings, and in particular to FIGS. 1 through 6 thereof, a new tombstone device embodying the principles and concepts of an embodiment of the disclosure and generally designated by the reference numeral 10 will be described.

As best illustrated in FIGS. 1 through 6, the multimedia tombstone device 10 generally comprises a tombstone 12 which is positionable at a gravesite 14 such that the tombstone 12 is visible to an observer 16 of the gravesite 14. The tombstone 12 is substantially hollow and the tombstone 12 may be comprised of a resilient material, including but not being limited to, high impact plastic or stone or other material that is highly weather resistant and is resistant to being degraded by ultraviolet radiation. The tombstone 12 has a front wall 18, a back wall 20 and a perimeter wall 22 extending between the front wall 18 and the back wall 20 and the perimeter wall 22 has a bottom side 24, a first lateral side 26, a second lateral side 28 and a top side 29.

The first lateral side 26 has a first vertical portion 30 extending upwardly from the bottom side 24 and a first horizontal portion 32 that is perpendicular to the first vertical portion 30. The first lateral side 26 has a second vertical potion 34 which is perpendicular to the first horizontal portion 30 and a second horizontal portion 36 which is perpendicular to the second vertical portion 34. The second vertical portion 34 is spaced inwardly from and lies on a plane which is oriented parallel to the first vertical portion 30. Additionally, the second horizontal portion 36 is spaced upwardly from and lies on a plane which is oriented parallel to the first horizontal portion 30. The second lateral side 28 has a first vertical portion 38 extending upwardly from the bottom side 24 and a first horizontal portion 40 that is perpendicular to the first vertical portion 38 of the second lateral side 28. The second lateral side 28 has a second vertical potion 42 which is perpendicular to the first horizontal portion 40 of the second lateral side 28 and a second horizontal portion 44 which is perpendicular to the second vertical portion 42 of the second lateral side 28. The second vertical portion 38 of the second lateral side 28 is spaced inwardly from and lies on a plane which is oriented parallel to the first vertical portion 38 of the second lateral side 28. Additionally, the second horizontal portion 44 of the second lateral side 28 is spaced upwardly from and lies on a plane which is oriented parallel to the first horizontal portion 40 of the second lateral side 28. The top side 29 extends between the second horizontal portion 36 of the first lateral side 26 and the second horizontal portion 44 of the second lateral side 28. Additionally, the top side 29 curves upwardly between each of the first lateral side 26 and the second lateral side 28.

The tombstone 12 has indicia 46 which are engraved into the front wall 18 such that the indicia 46 are visible to the observer 16 of the gravesite 14. The indicia 46 comprise letters forming the name of the decedent in the gravesite 14 to indicate the identity of the decedent to the observer 16 of the gravesite 14. A display 48 is integrated into the tombstone 12 such that the display 48 is visible to the observer 16 of the gravesite 14. The display 48 is disposed on the front wall 18 of the tombstone 12 and the display 48 is centrally located on the front wall 18. Furthermore, the indicia 46 are positioned between the display 48 and the bottom side 24 of the perimeter wall 22 of the tombstone 12. The display 48 may comprise a light emitting diode display or other type of electronic display and the display 48 may include a border 50 that extends forwardly from the front wall 18 of the tombstone 12.

A multimedia unit 52 is integrated into the tombstone 12 and the multimedia unit 52 stores a first database 54 comprising an obituary of the decedent, a second database 56 comprising digital imagery pertaining to the decedent and a third database 58 comprising a biography of the decedent. Additionally, the multimedia unit 52 is in communication with the display 48 thereby facilitating the display 48 to display either the obituary of the decedent or the digital imagery pertaining to the decedent or the biography of the decedent. In this way the multimedia unit 52 facilitates the observer 16 of the gravesite 14 to view the obituary or the digital imagery or the biography.

The multimedia unit 52 comprises a processor 60 that is positioned within the tombstone 12 and the processor 60 receives an actuate input, an obituary input, an imagery input and a biography input. The processor 60 is electrically coupled to the display 48 and the display 48 is actuated when the processor 60 receives the actuate input. The multimedia unit 52 includes an electronic memory 62 that is positioned within the tombstone 12. The electronic memory 62 is electrically coupled to the processor 60 and the electronic memory 62 stores the first database 54, the second database 56 and the third database 58. Additionally, the first database 54 and the second database 56 and the third database 58 can be uploaded into the electronic memory 62 during the manufacturing process of the tombstone 12.

The multimedia unit 52 includes a power button 64 that is movably integrated into the front wall 18 of the tombstone 12 such that the power button 64 can be manipulated by the observer 16 of the gravesite 14. The power button 64 is electrically coupled to the processor 60 and the processor 60 receives the actuate input and the obituary input when the power button 64 is depressed. Furthermore, the display 48 displays indicia comprising the obituary when the processor 60 receives the obituary input. The display 48 displays the digital imagery when the processor 60 receives the imagery input and the display 48 displays indicia comprising the biography when the processor 60 receives the biography input. The digital imagery may include video clips of the decedent, photographs of the decedent over various times of their lives and other types of digital imagery for memorializing the decedent which were chosen by the decedent while the decedent was still living. In this way the decedent can be memorialized in a manner that conforms to the wishes of the decedent while the decedent was still alive. Furthermore, the biography and the obituary may have been written by the decedent while the decedent was still alive or may have been written by an individual chosen by the decedent while the decedent was still alive.

The multimedia unit 52 includes an imagery button 66 that is movably integrated into the front wall 18 of the tombstone 12 such that the imagery button 66 can be manipulated by the observer 16 of the gravesite 14. The processor 60 receives the imagery input when the imagery button 66 is depressed subsequent to the power button 64 is depressed. The multimedia unit 52 includes a biography button 68 which is movably integrated into the front wall 18 of the tombstone 12 such that the biography button 68 can be manipulated to the observer 16 of the gravesite 14. The processor 60 receives the biography input when the biography button 68 is depressed subsequent to the power button 64 is depressed. The power button 64 is positioned above the display 48, the imagery button 66 is positioned above the display 48 and the biography button 68 is positioned above the display 48. Furthermore, each of the biography button 68 and the power button 64 and the imagery button 66 is arranged in a row 70 which extends along a line extending between the first lateral side 26 and the second lateral side 28 of the perimeter wall 22 of the tombstone 12.

The multimedia unit 52 includes a power supply 72 which is integrated into the tombstone 12 and the power supply 72 is electrically coupled to the processor 60. The power supply 72 comprises a rechargeable battery 74 which is positioned within the tombstone 12 and the rechargeable battery 74 is electrically coupled to the processor 60. The power supply 72 includes a solar panel 76 which is integrated into an outer surface 78 of the top side 29 of the perimeter wall 22 of the tombstone 12 such that the solar panel 76 is exposed to sunlight. Furthermore, the solar panel 76 is electrically coupled to the rechargeable battery 74 for charging the rechargeable battery 74.

A light 80 is integrated into the tombstone 12 and the light 80 emits light outwardly from the tombstone 12. In this way the observer 16 of the gravesite 14 can locate the tombstone 12 during darkened hours. The light 80 is electrically coupled to the processor 60 thereby facilitating the light 80 to be continuously actuated. Furthermore, the light 80 is disposed on the front wall 18 of the tombstone 12 and the light 80 is positioned above the power button 64. The light 80 may comprise a light emitting diode or other type of electronic light emitter that has a service life of at least 10.0 years.

In use, the observer 16 depresses the power button 64 to actuate the display 48 to begin displaying the obituary of the decedent to facilitate the observer 16 to gain basic knowledge about the decedent. The observer 16 can depress the imagery button 66 to view the digital imagery stored in the electronic memory 62 and the observer 16 can depress the biography button 68 to read the biography of the decedent on the display 48. In this way the observer 16 can enjoy the full experience of memorializing the decedent through the digital imagery and the biography. Furthermore, the light 80 is continually actuated thereby facilitating the tombstone 12 to be located at night as well as serving as a continual visual reminder of the light the decedent brought into the world while the decedent was still alive. The display 48 is turned off after a pre-determined duration of time, possibly ranging between 10.0 minutes and 20.0 minutes, and can be re-actuated at any time by depressing the power button 64.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A multimedia tombstone device for displaying video clips and biographical information about a decedent, said device comprising:

a tombstone being positionable at a gravesite wherein said tombstone is configured to be visible to observers of said gravesite, said tombstone being substantially hollow, said tombstone having a front wall, a back wall and a perimeter wall extending between said front wall and said back wall, said perimeter wall having a bottom side and a first lateral side and a second lateral side and a top side, each of said first lateral side and said second lateral side having a first vertical portion extending upwardly from said bottom side and a first horizontal portion being perpendicular to said first vertical portion and a second vertical potion being perpendicular to said first horizontal portion and a second horizontal portion being perpendicular to said second vertical portion, said second vertical portion of a respective one of said first lateral side and said second lateral side being spaced inwardly from and lying on a plane being oriented parallel to said first vertical portion of said respective first lateral side or said second lateral side, said second horizontal portion of a respective one of said first lateral side and said second lateral side being spaced upwardly from and lying on a plane being oriented parallel to said first horizontal portion of said respective first lateral side or said second lateral side, said top side extending between said second horizontal portion of each of said first lateral side and said second lateral side, said top side curving upwardly between said second horizontal portion of each of said first lateral side and said second lateral side, said tombstone having indicia being engraved into said front wall wherein said indicia is configured to be visible to the observer of said gravesite, said indicia comprising letters forming the name of the decedent in said gravesite wherein said indicia are configured to indicate the identity of the decedent to the observers of said gravesite;

a display being integrated into said tombstone wherein said display is configured to be visible to the observers of said gravesite, said display being disposed on said front wall of said tombstone, said display being centrally located on said front wall, said indicia being positioned between said display and said bottom side of said perimeter wall of said tombstone; and a multimedia unit being integrated into said tombstone, said multimedia unit storing a first database comprising an obituary of the decedent, said multimedia unit storing a second database comprising digital imagery pertaining to the decedent, said multimedia unit storing a third database comprising a biography of the decedent, said multimedia unit being in communication with said display thereby facilitating said display to display either said obituary of the decedent or said digital imagery pertaining to the decedent or said biography of the decedent wherein said multimedia unit is configured to facilitate to observer of said gravesite to view said obituary or said digital imagery or said biography, said multimedia unit comprising:

a processor being positioned within said tombstone, said processor receiving an actuate input and an obituary input and an imagery input and a biography input, said processor being electrically coupled to said display, said display being actuated when said processor receives said actuate input;

an electronic memory being positioned within said tombstone, said electronic memory being electrically coupled to said processor, said electronic memory storing said first database and said second database and said third database;

a power button being movably integrated into said front wall of said tombstone wherein said power button is configured to be manipulated by the observer of said gravesite, said power button being electrically coupled to said processor, said processor receiving said actuate input and said obituary input when said power button is depressed, said display displaying indicia comprising said obituary when said processor receives said obituary input, said display displaying said digital imagery when said processor receives said imagery input, said display displaying indicia comprising said biography when said processor receives said biography input, said power button being positioned above said display;

an imagery button being movably integrated into said front wall of said tombstone wherein said imagery button is configured to be manipulated by the observer of said gravesite, said processor receiving said imagery input when said imagery button is depressed subsequent to said power button being depressed, said imagery button being positioned above said display;

a biography button being movably integrated into said front wall of said tombstone wherein said biography button is configured to be manipulated to the observer of said gravesite, said processor receiving said biography input when said biography button is depressed subsequent to said power button being depressed, said biography button being positioned above said display, each of said biography button and said power button and said imagery button being arranged in a row which extends along a line extending between said first lateral side and said second lateral side of said perimeter wall of said tombstone; and a power supply being integrated into said tombstone, said power supply being electrically coupled to said processor, said power supply comprising:

a rechargeable battery being positioned within said tombstone, said rechargeable battery being electrically coupled to said processor; and a solar panel being integrated into an outer surface of said top side of said perimeter wall of said tombstone wherein said solar panel is configured to be exposed to sunlight, said solar panel being electrically coupled to said rechargeable battery for charging said rechargeable battery; and a light being integrated into said tombstone wherein said light is configured to emit light outwardly from said tombstone thereby facilitating the observer of said gravesite to locate said tombstone during times of day when external sunlight is absent, said light being electrically coupled to said processor, said light being disposed on said front wall of said tombstone, said light being positioned above said power button, said light being continuously actuated such that said light facilitates location of said tombstone at night and is configured to serve as a continual visual reminder of the decedent.

* * * * *